United States Patent [19]

Prozeller et al.

[11] Patent Number: 4,915,363
[45] Date of Patent: Apr. 10, 1990

[54] IMPACT DAMPER

[75] Inventors: Ernst Prozeller, Schweinfurt; Werner Christel, Hambach, both of Fed. Rep. of Germany

[73] Assignee: Fichtel & Sachs AG, Schweinfurt, Fed. Rep. of Germany

[21] Appl. No.: 372,028

[22] Filed: Jun. 27, 1989

[30] Foreign Application Priority Data

Jul. 1, 1988 [DE] Fed. Rep. of Germany ....... 3822322

[51] Int. Cl.⁴ .................. B60R 19/32; B60R 19/34
[52] U.S. Cl. ................... 267/64.15; 267/116; 188/280; 188/297; 188/322.15; 293/133; 293/134; 137/68.1; 137/71
[58] Field of Search .............. 293/134, 132, 133; 188/279, 280, 297, 322.15; 137/68.1, 71; 213/223; 267/64.15, 116

[56] References Cited

U.S. PATENT DOCUMENTS

| 3,993,294 | 11/1976 | Wössner et al. | 293/134 X |
| 4,003,454 | 1/1977 | Wössner | 293/134 X |
| 4,426,109 | 1/1984 | Fike, Jr. | 293/133 |

FOREIGN PATENT DOCUMENTS 2503565 8/1976 Fed. Rep. of Germany ...... 293/134
2422479 6/1989 Fed. Rep. of Germany .

Primary Examiner—Dennis H. Pedder
Assistant Examiner—Obele Acha-Ngwodo
Attorney, Agent, or Firm—Brumbaugh, Graves, Donohue & Raymond

[57] ABSTRACT

An impact damper for a motor vehicle comprises two fluid chambers. These fluid chambers are interconnected by a fluid passage. In case of an impact of the motor vehicle against an obstacle, the fluid flows from one fluid chamber to the other fluid chamber through the throttled passage. If the impact occurs with a high velocity beyond a predetermined velocity, the impact damper behaves like a rigid body. It may therefore occur that the vehicle is damaged to a higher degree than it would in case of lack of the impact damper. For preventing such situation, the passage is provided by perforated and sandwiched discs. One disc acts as a support disc, one other disc acts as a throttling disc. The throttling disc is provided with a weakening line and is broken at a predetermined pressure different between the two fluid chambers. After rupture has occurred, the flow resistance through the passage is reduced and therefore the rigid behavior of the impact damper is eliminated.

13 Claims, 2 Drawing Sheets

IMPACT DAMPER

BACKGROUND OF THE INVENTION

An impact damper is used for positioning a bumper member on the framework of a vehicle. The impact damper is dimensioned such that it damps impacts up to a predetermined impact velocity of the vehicle with respect to the obstacle. This predetermined velocity is e.g. 8 km/h. At a higher impact velocity the impact damper behaves like a rigid unit because the flow resistance between the respective fluid chambers of the impact damper is too high. As the impact damper is fastened to the framework of the vehicle, a high velocity impact is substantially rigidly transmitted to the framework and a considerable deformation of the framework occurs. The preset deformation zones of the vehicle cannot become effective to absorb part of the impact energy because the impact is directly and rigidly transmitted to the framework of the vehicle without the preset deformation zones being involved in absorbing the impact energy. Most sensitive parts of the vehicle are frequently mounted on the framework to which also the impact damper is fastened too. As a result of the damage to the framework resulting from the rigid behavior of the impact damper, these sensitive parts of the vehicle are also damaged.

STATEMENT OF THE PRIOR ART

An impact damper is known from German Pat. No. 2 422 479. With this known impact damper the maximum permissible damping force is limited by a preset breaking point of a damper component subject to a high fluid pressure in case of a high velocity impact. The preset breaking point is not sufficiently defined with the known impact damper. Therefore, the velocity at which rupture of the preset breaking point occurs is not sufficiently exactly defined. A further disadvantage of the known device is that the component in which the preset breaking point is provided must be manufactured on swarf removing machines, e.g. turning machines, and are therefore expensive. Moreover, the dimension of this component must be adapted to the respective vehicle and to the desired behaviour of the impact damper by complicated re-dimensioning.

OBJECT OF THE INVENTION

It is the object of the present invention to provide in an impact damper a fluid passage the cross-section of which is increased at a well defined predetermined impact velocity of the vehicle, such that the rigid behaviour of the impact damper is suppressed above said predetermined velocity. It is a further object of the present invention to provide an impact damper in which the components defining the fluid passage are easily and economically available and can be easily combined in accordance with specific requirements.

SUMMARY OF THE INVENTION

An impact damper is used for positioning a bumper member of a motor vehicle with respect to the framework of a motor vehicle. This impact damper comprises two damper elements movable with respect to each other. One of these damper elements is connectable with the framework, the other damper element is connectable with the bumper member. These damper elements are biased towards a first relative terminal position by substantially elastic biasing means. At least two fluid chambers are defined within the impact damper. These fluid chambers are interconnected by throttled passage means. The damper elements are movable towards a second relative terminal position in response to an impact to be absorbed. The fluid chambers have respective volumes in the first terminal position. The relationship of these respective volumes is variable in response to a relative movement of the damper elements towards the second relative terminal position. A fluid flow occurs through the throttled passage means which results from the variation of the relationship of volumes of the fluid chambers in response to said relative movement. The throttled passage means comprise a sandwich arrangement of at least two discs, namely a support disc and a throttling disc. The support disc and the throttling disc have substantially aligned holes. These holes define the cross-sectional area of the throttled passage means The cross-sectional area of the hole in the throttling disc is smaller than the cross-sectional area of the hole in the support disc. The support disc follows the throttling disc in the direction of fluid flow occurring on impacts to be absorbed. A preset breaking line is defined for the throttling disc. This throttling disc is broken along the preset breaking line in response to a predetermined pressure difference between the fluid chambers which pressure difference results from the above said relative movement, such as to increase the cross-sectional area of the hole in said throttling disc.

The breaking line and the breaking resistance along the breaking line can be exactly defined in the throttling disc. The cross-sectional area of the passage means can be easily adapted to specific requirements by selecting specific throttling discs.

The throttling disc may be e.g. an aluminium washer which is sheared by the pressure difference. The thickness of the aluminium washer may be in the order of size of 1 to 2 mm. Instead of aluminium washers thin-walled steel washers can be equally be used. In case of such thin-walled steel washers one must take care, however, that they are not lifted from the support disc if, after an impact resulting in less than the predetermined pressure difference, fluid flows back via reverse flow direction. So it may be necessary to provide additional fastening means for preventing the lifting of the throttling disc from the support disc.

The sandwich arrangement may comprise at least one further disc, namely a cover disc. This cover disc precedes the throttling disc in the direction of said fluid flow resulting from an impact. The cover disc has a hole in substantial alignment with the holes of the throttling disc and the support disc. The cover disc avoids the lifting of the throttling disc from the support disc under reverse flow conditions, even if the throttling disc is a thin-walled steel washer.

According to a preferred embodiment, the hole in the cover disc has a cross-sectional area larger than the cross-sectional area of the hole in the throttling disc before rupture and smaller than the increased cross-sectional area of the hole in the throttling disc after rupture. In such case, the hole in the cover disc defines the flow cross-section after rupture, particularly if the hole in the cover disc is smaller than the hole in the support disc.

The throttling disc may have a substantially constant wall thickness such as to be sheared off by said predetermined pressure difference. In this case, the preset breaking line may be defined by the contour of the hole in said support disc.

The alternative preset breaking line may be defined by a weakening line of the throttling disc and this weakening line may be defined by a groove in at least one side face of the throttling disc.

Assembly of the impact damper may be facilitated in that the cover disc has a centering flange axially directed towards the support disc. This centering flange may engage a centering recess of the support disc, and the throttling disc may be centered within the centering flange.

The principles of this invention are applicable to conventional impact dampers such as described in more detail in German Pat. No. 2 422 479. In such conventional impact dampers, one of the damper elements is a cylinder having an axis and two ends and defining a cavity therein. One of said ends is closed. The other of said ends is provided with a piston rod guiding and sealing unit. A piston rod member forming the other of the damper elements is guided through the piston rod guiding and sealing unit inwards and outwards of the cavity. A first fluid chamber is defined within the cavity, a second fluid chamber is defined within the piston rod member. With such a construction the sandwich arrangement may be provided adjacent to an inner end of the piston rod member.

The piston rod member may further be expanded adjacent to the inner end thereof, such as to form a piston portion engageable with an integral surface of the cylinder member. In such case the sandwich arrangement may be provided within the expanded portion of the piston rod member forming said piston portion. Further, in such a construction, the second fluid chamber may be located within the piston rod member adjacent to the sandwich arrangement, and the second fluid chamber may be separated from a compensation chamber within the piston rod member by a floating separating wall. In such case, the elastic biasing means are provided within the compensation chamber and act onto the floating wall.

The elastic biasing means may comprise a volume of pressurized gas, and the fluid chambers may contain a liquid.

In cases in which a weakening groove is defining the preset breaking line, this weakening groove is preferably also positioned along the edge of the support disc encircling the hole of the support disc.

The various features of novelty which characterize the invention are pointed out with particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings, in which.

DESCRIPTION OF THE PREFERRED EMBODIMENTS

Figure 1:
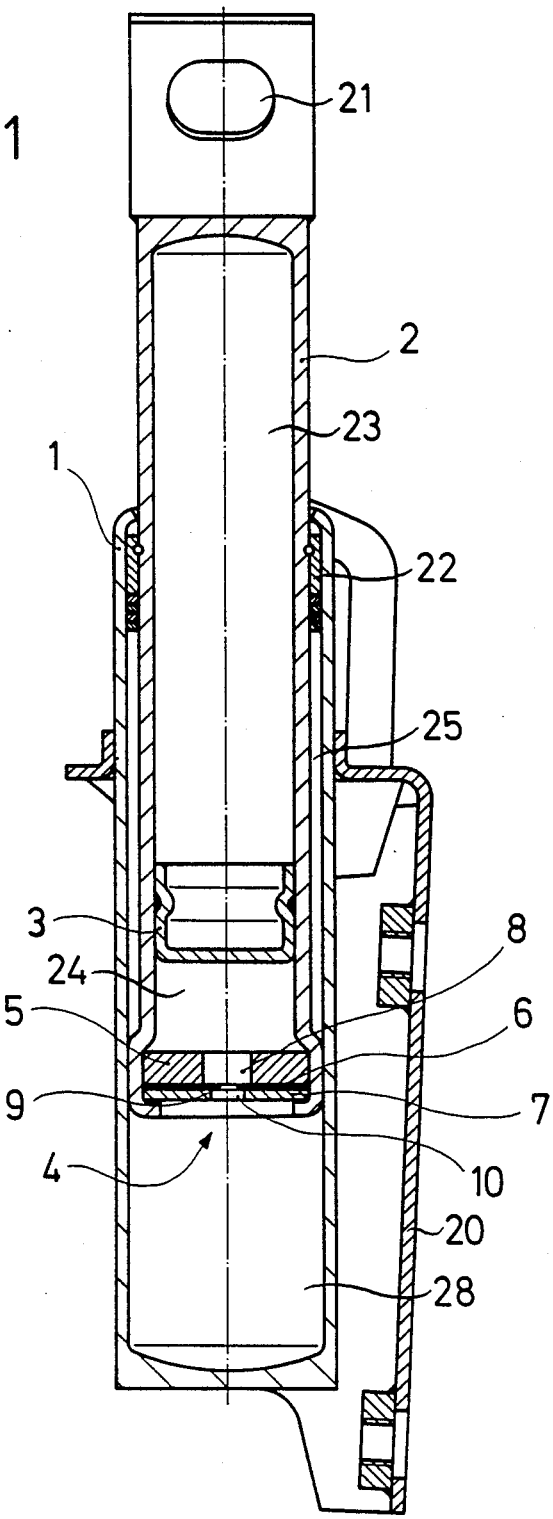
FIG. 1 shows a longitudinal section through the impact damper in accordance with the invention.

The impact damper as shown in FIG. 1 is connected with a fastening component 20 secured to the cylinder 1 which fastening component can be fixed to the vehicle bodywork. Further, the piston rod 2 is provided with a fastening eye 21 to be connected with a bumper bar (not shown).

By two such impact dampers the bumper bar (not shown) is in connection with the vehicle bodywork (likewise not shown). The impact dampers possess a speed-dependently acting damping power, ordinarily being designed so that up to about 8 km/h the impact energy is elastically taken up by the impact dampers and damage to the vehicle or vehicle parts is avoided. By reason of the speed-dependent damping force such an impact damper acts at high speeds of impact as a nearly rigid structure, so that predominantly the relatively rigid vehicle girder parts and not the crumple zone take up the energy of impact. In order to prevent this, a preset breaking point is provided on the piston 4 of the impact damper.

Figure 2:
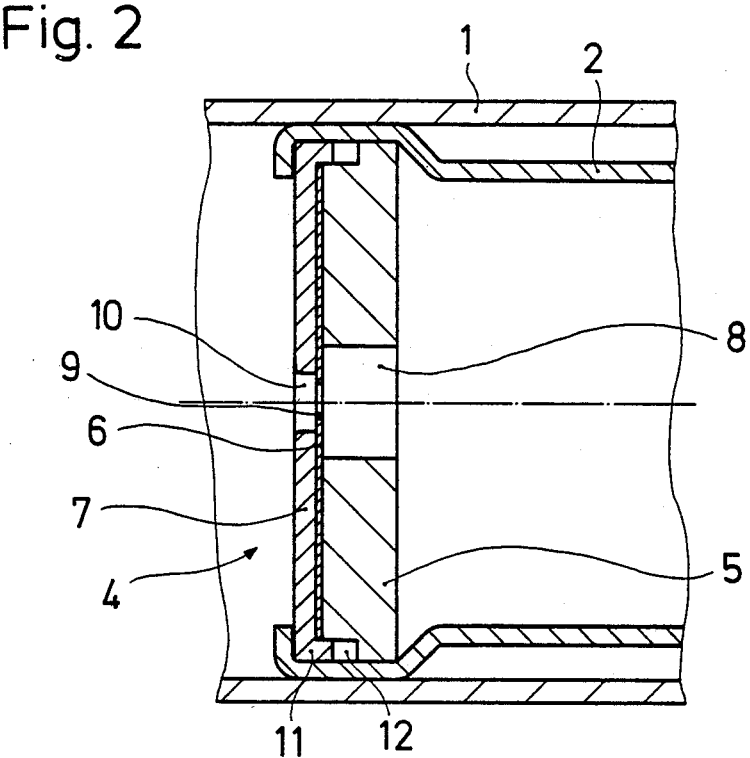
FIG. 2 shows the region of the piston in enlarged representation.
Figure 4:
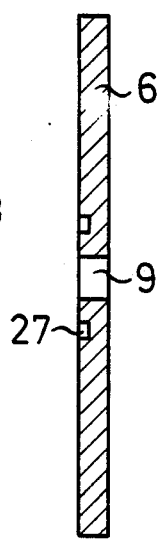
FIG. 4 shows an enlarged representation of the throttling disc with a weakening groove provided therein.

In the embodiment of the impact damper according to FIGS. 1 and 2, the piston rod 2 guided in the cylinder 1 is widened at the lower end thereof. It is to be noted that in practice, the impact damper is horizontally arranged and the term lower and upper refers only to the representation as shown in FIG. 1. The piston rod 2 is guided in the upper end of the cylinder 1 by a piston rod guiding and sealing unit 22. The piston 4 is secured in this widened portion, while a separator wall 3 is arranged in the interior of the piston rod 2 and separates a gas filling above the separator wall 3 from a liquid filling below the separator wall 3. The fluid chamber above the separator wall 3 is designated by 23 and the fluid chamber below the separator wall 3 is designated by 24. The gas filling within the fluid chamber 23 is under pressure. The liquid filling is situated also in a fluid chamber 28 of the cylinder 1 below the piston 4 and possibly also within the annular space 25 radially between the piston rod 2 and the cylinder 1. The piston 4 consists of a support disc 5, a throttling disc 6 and a cover disc 7. Each of these discs possesses a central hole, the support disc 5 being provided with a hole 8 which is larger in diameter than a constricted hole 9 provided in the throttling disc 6. The size of this constricted hole 9 is adapted to the damping power for a predetermined speed of impact, preferably 8 km/h in consideration of the respective mass of the vehicle A further central hole 10 is provided in the cover disc 7. This hole 10 forms the constricted cross-section at high speeds of impact after the throttling disc 5 has been broken along a preset breaking line. The edge of the hole 8 situated in the support disc 5, which edge abuts the throttling disc 6, forms the breaking line or shear-off edge for the throttling disc 6. That is on exceeding a maximum permissible damping force, the part of the throttling disc 6 carrying the constricted hole 9 is shorn off along the edge of the hole 8 such that the hole 10 in the cover disc 7 determines the damping effect The throttling disc 6 can be provided with a notching 27 as shown in FIG. 4. This notching is provided in the region of the shear-off edge formed by the hole 8, whereby an especially smooth break and a close tolerance for the maximum permissible damping force after shearing off are obtained. To facilitate assembly, the cover disc 7 is provided with a centering collar 11 which engages in a corresponding recess 12 of the support disc 5. In the assembly of the discs thus the throttling disc 6 is held by the centering collar 11 in the desired position and secure clamping of this throttling disc 6 between the support disc 5 and the cover disc 7 is achieved. A substantial simplification of the manufacturing and storing of impact dampers is obtained in that only one specific throttling disc 6 has to be provided for each vehicle type, while the other washers remain the same and thus these simple components can be produced in great numbers. The throttling disc 6 too is a favorably priced, easily produced component which can be adapted without problem to the desired damping forces.

Figure 3:
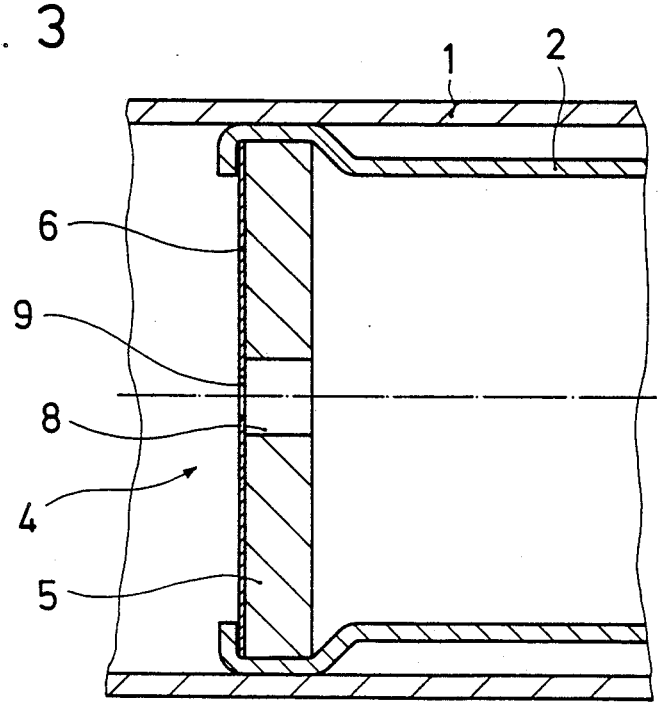
FIG. 3 shows a modified form of embodiment of the piston.

A further form of embodiment is shown in FIG. 3, which differs essentially from that according to FIGS. 1, 2 and 4 in that the throttling disc 6 comprising the constricted hole 9 is only resting on the support disc 5. The hole 8 of the support disc 5 is here designed so that it forms the constricted cross-section when the throttling disc 6 is broken. The piston 4 thus formed is still simpler in construction. This design is however suitable essentially only when for example the throttling disc 6 is an aluminium disc which comprises a disc thickness of 1 to 2 mm. A thin steel disc as throttling disc 6 which can be used in the embodiment of FIG. 2 requires in case of the embodiment of FIG. 3 a flat-area connection with the support disc 5 for making sure that the throttling disc 6 does not lift itself away from the support disc 5 in the return stroke of the impact damper after an impact of less than 8 km/h has occurred.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. An impact damper for positioning a bumper member of a motor vehicle with respect to the framework of said motor vehicle, said impact damper comprising two damper elements (1,2) movable with respect to each other, one (1) of said damper elements (1,2) being connectable with said framework, the other (2) of said damper elements (1,2) being connectable with said bumper member, said damper elements (1,2) being biased towards a first relative terminal position by substantially elastic biasing means, at least two fluid chambers (28,24) being defined within said impact damper, said fluid chambers (28,24) being interconnected by throttled passage means (9,8), said damper elements (1,2) being movable towards a second relative terminal position in response to an impact to be absorbed, said fluid chambers (28,24) having respective volumes in said first terminal position, the relationship of said respective volumes being variable in response to a relative movement of said damper elements (1,2) towards said second relative terminal position, a fluid flow through said throttled passage means (9,8) resulting from variation of said relationship of volumes of said fluid chambers (28,24) in response to said relative movement, said throttled passage means (9,8) comprising a sandwich arrangement of at least two discs (6,5), namely a support disc (5) and a throttling disc (6), said support disc (5) and said throt- tling disc (6) having substantially aligned holes (8,9), said holes (8,9) defining the cross-sectional area of said throttled passage means (9,8), the cross-sectional area of said hole (9) in said throttling disc (6) being smaller than the cross-sectional area of said hole (8) in said support disc (5), said support disc (5) following said throttling disc (6) in the direction of said fluid flow, a preset breaking line (27) being defined for said throttling disc (6), said throttling disc (6) being broken along said preset breaking line (27) in response to a predetermined pressure difference between said fluid chambers (28,24) resulting from said relative movement such as to increase the cross-sectional area of said hole (9) in said throttling disc (6).

2. An impact damper as set forth in claim 1, said sandwich arrangement comprising at least one further disc (7), namely a cover disc (7), said cover is (7) preceding said throttling disc (6) in the direction of said fluid flow, said cover disc (7) having a hole (10) in substantial alignment with said holes (9 and 8) of said throttling disc (6) and said support disc (5).

3. An impact damper as set forth in claim 2, said hole (10) in said cover disc (7) having a cross-sectional area larger than the cross-sectional area of said hole (9) in said throttling disc (6) before rupture and smaller than the increased cross-sectional area of said hole (9) in said throttling disc (6) after rupture.

4. An impact damper as set forth in claim 1, said throttling disc (6) having a substantially constant wall thickness such as to be sheared off by said predetermined pressure difference.

5. An impact damper as set forth in claim 1, said preset breaking line being defined by the contour of said hole (8) in said support disc (5).

6. An impact damper as set forth in claim 1, said preset breaking line being defined by a weakening line (27) of said throttling disc (6).

7. An impact damper as set forth in claim 6, said weakening line (27) being defined by a groove (27) in at least one side face of said throttling disc (6).

8. An impact damper as set forth in claim 2, said cover disc (7) having a centering flange (11) axially directed towards said support disc (5), said centering flange (11) engaging a centering recess (12) of said support disc (5), said throttling disc (6) being centered within said centering flange (11).

9. An impact damper as set forth in claim 1, one of said damper elements (1,2) being a cylinder (1) having an axis and two ends and defining a cavity (28,25) therein, one of said ends being closed, the other of said ends being provided with a piston rod guiding and sealing unit (22), a piston rod member (2) being guided through said piston rod guiding and sealing unit (22) inwards and outwards of said cavity, a first fluid chamber (28) being defined within said cavity, a second fluid chamber (24) being defined within said piston rod member (2), said sandwich arrangement (5,6) being provided adjacent to an inner end of said piston rod member (2).

10. An impact damper as set forth in claim 9, said piston rod member (2) being expanded adjacent to the inner end thereof such as to form a piston portion engageable with an internal surface of said cylinder member (1), said sandwich arrangement (5,6) being provided within said expanded portion of said piston rod member (2) forming said piston portion.

11. An impact damper as set forth in claim 9, said second fluid chamber (24) being located within said piston rod member (2) adjacent to said sandwich arrangement (5,6), said second fluid chamber (24) being separated from a compensation chamber (23) within said piston rod member (2) by a floating separating wall (3), said elastic biasing means being provided within said compensation chamber (23) and acting onto said floating wall (3).

12. An impact damper as set forth in claim 1, said elastic biasing means comprising a volume of pressurized gas.

13. An impact damper as set forth in claim 1, said fluid chambers (28,24) containing a liquid.

* * * * *

UNITED STATES PATENT AND TRADEMARK OFFICE
CERTIFICATE OF CORRECTION

PATENT NO. : 4,915,363

DATED : April 10, 1990

INVENTOR(S) : Ernst Prozeller and Werner Christel

It is certified that error appears in the above-identified patent and that said Letters Patent is hereby corrected as shown below:

Col. 2, line 39, delete "be" (first occurrence);
Col. 6, line 17, "cover is" should read --cover disc--.

Signed and Sealed this

Thirteenth Day of August, 1991

Attest:

HARRY F. MANBECK, JR.

Attesting Officer

Commissioner of Patents and Trademarks